(12) United States Patent
Jalkanen et al.

(10) Patent No.: US 11,418,946 B2
(45) Date of Patent: Aug. 16, 2022

(54) UPDATE OF A NETWORK DEVICE IN A MOBILE COMMUNICATION NETWORK

(71) Applicant: Telia Company AB, Solna (SE)

(72) Inventors: Tero Jalkanen, Tuusula (FI); Tomi Sarajisto, Helsinki (FI)

(73) Assignee: TELIA COMPANY AB, Solna (SE)

( * ) Notice: Subject to any disclaimer, the term of this patent is extended or adjusted under 35 U.S.C. 154(b) by 3 days.

(21) Appl. No.: 16/921,280

(22) Filed: Jul. 6, 2020

(65) Prior Publication Data
US 2021/0006966 A1 Jan. 7, 2021

(30) Foreign Application Priority Data
Jul. 4, 2019 (FI) ........................................ 20195612

(51) Int. Cl.
*H04M 3/00* (2006.01)
*H04W 8/22* (2009.01)
*H04W 60/00* (2009.01)

(52) U.S. Cl.
CPC ............. *H04W 8/22* (2013.01); *H04W 60/00* (2013.01)

(58) Field of Classification Search
None
See application file for complete search history.

(56) References Cited

U.S. PATENT DOCUMENTS

| | | | |
|---|---|---|---|
| 2005/0027789 A1* | 2/2005 | Luo ......................... | G06F 9/485 709/200 |
| 2006/0160543 A1* | 7/2006 | Mashinsky ........... | H04W 16/10 455/452.2 |
| 2009/0017812 A1 | 1/2009 | Chan et al. | |
| 2010/0131628 A1 | 5/2010 | Yu et al. | |

(Continued)

FOREIGN PATENT DOCUMENTS

| | | |
|---|---|---|
| EP | 2466932 A1 | 6/2012 |
| EP | 2 750 467 A1 | 7/2014 |
| EP | 3373621 A1 | 9/2018 |

(Continued)

OTHER PUBLICATIONS

Finnish Search Report, dated Jan. 24, 2020, from corresponding Finnish application No. 20195612.

(Continued)

*Primary Examiner* — Jinsong Hu
*Assistant Examiner* — Alexander J Yi
(74) *Attorney, Agent, or Firm* — Nixon & Vanderhye

(57) ABSTRACT

Disclosed is a method for updating radio access technology related characteristic of a radio access network device, the method including: receiving a request requesting a service applying the radio access technology related characteristic; in response to a detection that the radio access network device does not support the requested service determining a capability to update the radio access network device; in response to a detection that the radio access network device is updateable retrieving data package to update at least the (Continued)

radio access network device; and delivering the data package to the radio access network device for updating the radio access network device to support the requested radio access technology related characteristic. The invention also relates to a network node, a communication system and a computer program thereto.

13 Claims, 3 Drawing Sheets

(56) References Cited

U.S. PATENT DOCUMENTS

2014/0211654 A1* 7/2014 Liu ................... H04L 27/0006
370/252

FOREIGN PATENT DOCUMENTS

| JP | 2018-055593 A | 4/2018 |
|---|---|---|
| WO | 2012/026857 A1 | 3/2012 |
| WO | 2017133461 A1 | 8/2017 |

OTHER PUBLICATIONS

3GPP TS 23.401 V16.3.0 (Jun. 2019), "3rd Generation Partnership Project; Technical Specification Group Services and System Aspects; General Packet Radio Service (GPRS) enhancements for Evolved Universal Terrestrial Radio Access Network (E-UTRAN) access", (Release 16). [online], Jun. 11, 2019, [retrieved on Jan. 24, 2020]. Retrieved from <https://www.3gpp.org/ftp/specs/archive/23_series/23.401/23401-g30 .zip>, The whole document, pp. 1-423.
European Search Report issued in European Patent Application No. EP 20 18 3090 dated Nov. 19, 2020.

* cited by examiner

US 11,418,946 B2

UPDATE OF A NETWORK DEVICE IN A MOBILE COMMUNICATION NETWORK

TECHNICAL FIELD

The invention concerns in general the technical field of telecommunications. More particularly, the invention concerns a management of network devices.

BACKGROUND

A complexity in a management of communication networks has increased partly because of a great variety of terminal devices willing to utilize services of the communication networks. Due to specific tasks of the terminal devices the requirements for the services vary a lot. On the other hand, the telecom operators have challenges to meet all the requirements due to technical and commercial reasons. For example, it is not necessarily reasonable to acquire all possible features for all base stations of the communication network if there are no terminal devices e.g. within an area which could utilize certain feature. Hence, the telecom operator shall optimize the features in view of costs when planning the communication network and developing it.

On the other hand, so-called Software Defined Radio (SDR) concept, or any similar technology, allows optimizing features of a radio device. Such a concept enables moving from the traditional "one radio unit for one frequency and one service" into model where the actual radio part of the base station, or other radio device, would be very slim adaptable node fully configurable by an advanced driver node handling all the necessary intelligence and processing capability.

Hence, by enabling the capability to update network nodes in accordance with user's needs customer satisfaction may be improved and the investments by the telecom operators may be optimized.

SUMMARY

The following presents a simplified summary in order to provide basic understanding of some aspects of various invention embodiments. The summary is not an extensive overview of the invention. It is neither intended to identify key or critical elements of the invention nor to delineate the scope of the invention. The following summary merely presents some concepts of the invention in a simplified form as a prelude to a more detailed description of exemplifying embodiments of the invention.

An object of the invention is to present a method, a network node, a communication system and a computer program for performing an update procedure of a network device.

The objects of the invention are reached by a method, a network node, a communication system and a computer program for performing an update procedure of a network device as defined by the respective independent claims.

According to a first aspect, a method for updating radio access technology related characteristic of a radio access network device is provided, the method comprising: receiving, by a core network node, a request from a terminal device through the radio access network device, the terminal device requesting a service applying the radio access technology related characteristic; in response to a detection, by the core network node, that the radio access network device does not support the requested service determining a capability to update the radio access network device; in response to a detection, by the core network node, that the radio access network device is updateable retrieving data package to update at least the radio access network device; and delivering, by the core network node, the data package to the radio access network device for updating the radio access network device to support the requested radio access technology related characteristic requested by the terminal device.

For example, the request may be received in a context of an attachment request.

An identifier of the radio access network device may be derived from the request originated from the terminal device, the identifier may be included by the radio access network device to the request.

The data package may be inquired from data storage by the core network node with the identifier of the radio access network device.

Moreover, the retrieved data package may further comprise data to update the terminal device. For example, the data to update the terminal device may be included in the data package on the basis of one of the following: an identifier included in the request received from the terminal device; the radio access technology related characteristic applied by the service.

Still further, at least one predetermined criterion may be set for retrieving the data package. The at least one predetermined criterion may be one of: at least one technical requirement for the data package, at least one commercial requirement of the data package.

In turn, the radio access technology related characteristic is one of: narrow-band IoT characteristic, a frequency band used for the service, data speed used in the service.

According to a second aspect, a network node for updating radio access technology related characteristic of a radio access network device is provided, the network node comprising: at least one processor; and at least one memory including computer program code; the at least one memory and the computer program code configured to, with the at least one processor, cause the network node to: receive a request from a terminal device through the radio access network device, the terminal device requesting a service applying the radio access technology related characteristic; determine, in response to a detection that the radio access network device does not support the requested service, a capability to update the radio access network device; retrieve, in response to a detection that the radio access network device is updateable, data package to update at least the radio access network device; and deliver the data package to the radio access network device for updating the radio access network device to support the requested radio access technology related characteristic requested by the terminal device.

For example, the network node may be arranged to receive the request in a context of an attachment request.

The network node may also be arranged to derive an identifier of the radio access network device from the request originated from the terminal device, the identifier may be included by the radio access network device to the request.

Moreover, the network node may be arranged to inquire the data package from data storage with the identifier of the radio access network device.

The retrieved data package may further comprise data to update the terminal device. For example, the network node may be arranged to receive the data to update the terminal device, the data to update the terminal device may be included in the data package on the basis of one of the following: an identifier included in the request received from the terminal device; the radio access technology related characteristic applied by the service.

Still further, the network node may comprise at least one predetermined criterion set for retrieving the data package. The at least one predetermined criterion may e.g. be one of: at least one technical requirement for the data package, at least one commercial requirement of the data package.

The radio access technology related characteristic, in turn, may be one of: narrow-band IoT characteristic, a frequency band used for the service, data speed used in the service.

According to a third aspect, a communication system is provided, the communication system comprising: at least one terminal device; a radio access network device; and a network node as defined according to the second aspect.

According to a fourth aspect, a computer program embodied on a computer readable medium is provided, the computer program comprising computer executable program code, which code, when executed by at least one processor of a network node, causes the network node to perform the method according to the first aspect.

The expression "a number of" refers herein to any positive integer starting from one, e.g. to one, two, or three.

The expression "a plurality of" refers herein to any positive integer starting from two, e.g. to two, three, or four.

Various exemplifying and non-limiting embodiments of the invention both as to constructions and to methods of operation, together with additional objects and advantages thereof, will be best understood from the following description of specific exemplifying and non-limiting embodiments when read in connection with the accompanying drawings.

The verbs "to comprise" and "to include" are used in this document as open limitations that neither exclude nor require the existence of unrecited features. The features recited in dependent claims are mutually freely combinable unless otherwise explicitly stated. Furthermore, it is to be understood that the use of "a" or "an", i.e. a singular form, throughout this document does not exclude a plurality.

BRIEF DESCRIPTION OF FIGURES

The embodiments of the invention are illustrated by way of example, and not by way of limitation, in the figures of the accompanying drawings.

DESCRIPTION OF THE EXEMPLIFYING EMBODIMENTS

The specific examples provided in the description given below should not be construed as limiting the scope and/or the applicability of the appended claims. Lists and groups of examples provided in the description given below are not exhaustive unless otherwise explicitly stated.

Figure 1:
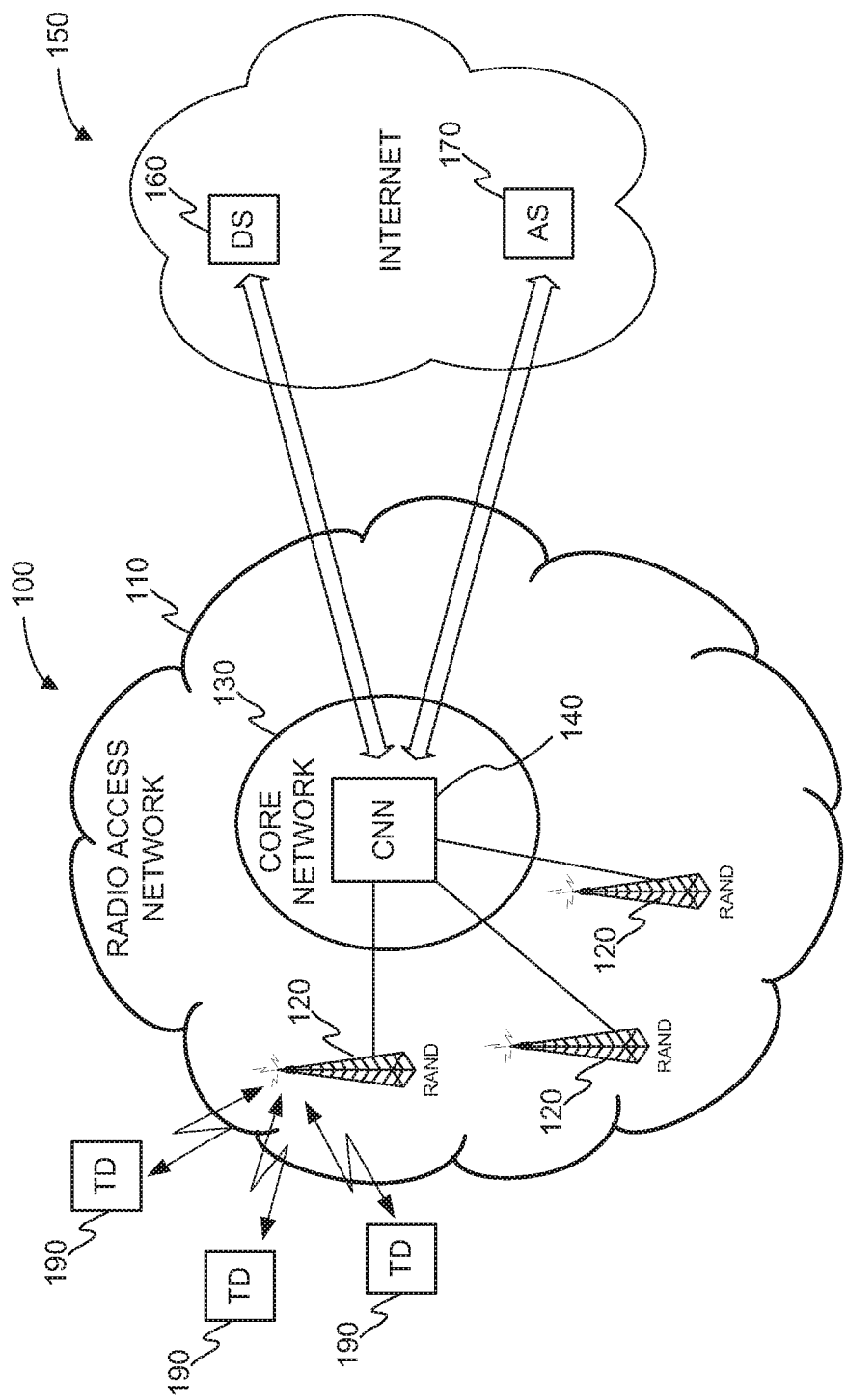
FIG. 1 illustrates schematically a communication system suitable for an implementation of the present invention.

FIG. 1 illustrates schematically a communication system suitable for an implementation of the present invention. Fundamentally thinking the communication system communication illustrated in FIG. 1 comprises a mobile communication network 100 consisting of a core network 110 and a radio access network 130. The core network 110 may be understood as a mobile communication network's core part, which offers numerous services to the subscribers who are interconnected by an access network. Some key functions of the core network 110 is to direct telephone calls as well as take care of overall management of the subscribers. For the purpose of the present invention the core network 130 may comprise a network node called as a core network node 140 arranged to perform operations as will be described in the forthcoming description. In addition to the core network node 140 the core network 130 may comprise further entities in order to perform the typical core network functionalities. Moreover, the radio access network 130, in turn, may be understood as a technology that connects individual devices to other parts of a network through radio connections. Core entities of the radio access network 130 are radio access network devices 120 also called as base stations which are serving terminal devices 190 residing in a service area of a radio access network device 120 in question.

Still further, the communication system may comprise a communication network 150, such as an Internet. The mobile communication network 100 and the communication network 150 may be arranged to interwork with each other by means of interworking entities. The communication network 150 may host a number of network entities, such as application servers 170 e.g. providing service with respect to one or more task of the terminal device 190 in the communication network 150. For example, the one or more terminal devices 190 may be IoT devices, such as devices for measuring temperature in premises, having a capability to communicate with the mobile communication network 110 which terminal devices 190 are configured to transmit measurement data to an application server 170 residing in the communication network. Additionally, the communication network 150 may host a number of data storages 160 at least some of which may e.g. be accessed from the mobile communication network 100. In some example embodiments at least some of the data storages 160 may be implemented in a context of another network entity, such as the core network node 140.

Figure 2:
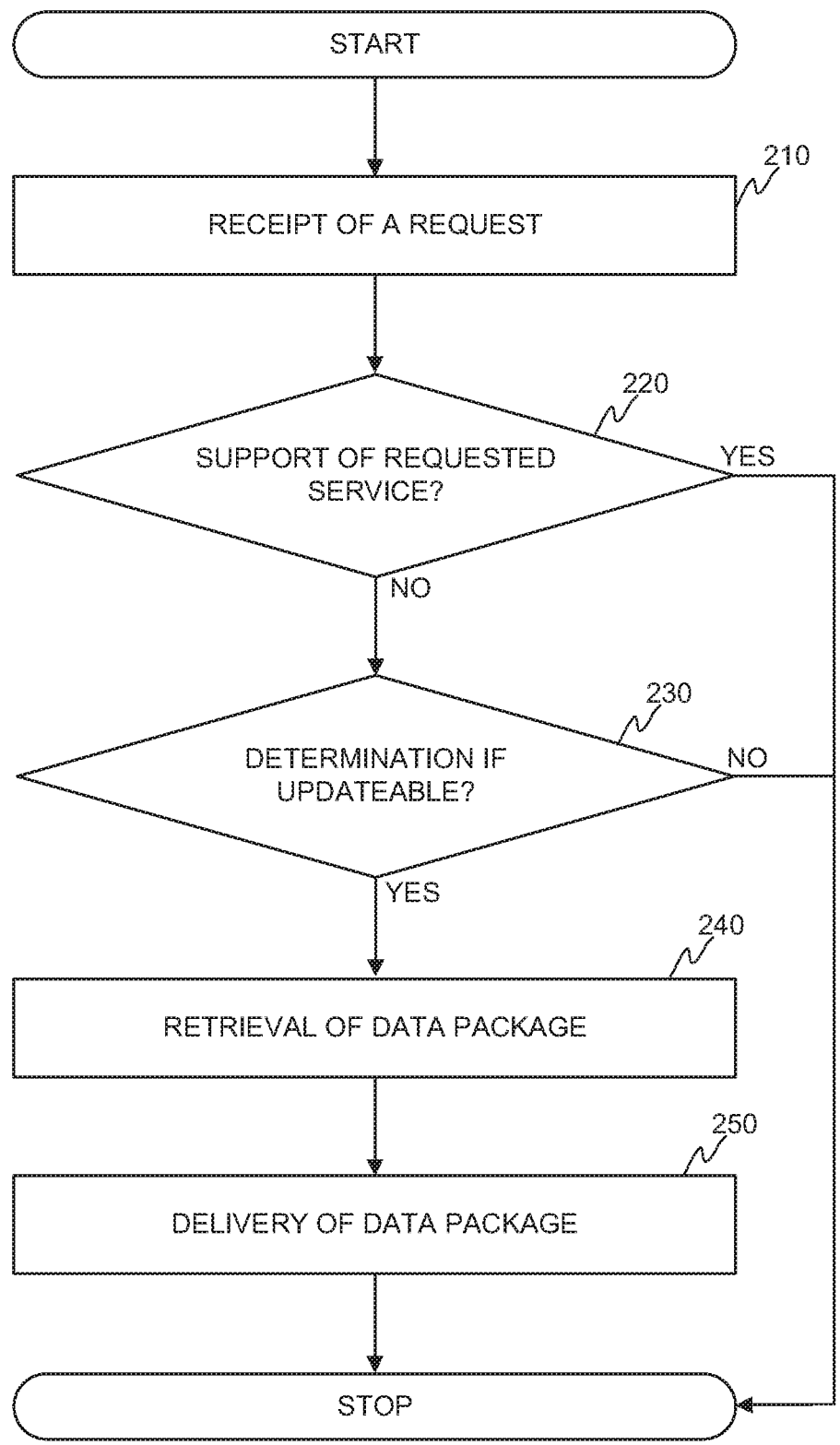
FIG. 2 illustrates schematically a method according to an example embodiment of the invention.

Next, at least some aspects of the present invention is described by referring to a method schematically illustrated in FIG. 2. As a starting point a terminal device 190, such as an IoT device, may enter an area served by a radio access network device 120. For example, a technician may install the device in a certain location and by switching on the terminal device 190 it may start searching for a radio access network to attach to. At some point of time the terminal device 190 may find a mobile communication network 100 providing a communication channel to a core network 130 of the mobile communication network 100 through the radio access network 110 and attaches to that network. The terminal device 190 may be arranged to establish a request defining a service it prefers to receive at least from the radio access network device 120. Preferences with respect to the service may be defined in a memory of the terminal device 190. A non-limiting example of the preference may e.g. be to receive communication service through so-called narrowband IoT communication technology in order to save battery life of the terminal device 190 as well as optimize, from the telecom operator perspective, usage of radio frequencies. Hence, the request may be received 210 by a core network device 140. For example, the request may be delivered in a context of an attachment request which may be generated by the terminal device 190 in response to a detection of a communication network providing communication services within an area of the terminal device 190. According to various embodiments of the invention the core network device 140 may be arranged to perform a detection 220 in response the receipt of the request if the radio access network device 120 supports the requested service or not. In response to the detection that the radio access device 120 supports the requested service the core network node 140 may e.g. be configured to instruct the radio access network device 120 to initiate a provision of the service accordingly. On the other hand, if the core network node 140 detects that the radio access device 120 does not support the requested service it may be arranged to determine a capability to update 230 the radio access network device 120. In order to perform the operations referred with references 220 and 230 in FIG. 2 the radio access network device 120 may be arranged to include in the request an identifier. The core network node 140 may use the identifier e.g. in an inquiry to a database to determine a type of the radio access network device 120 and its capabilities, for example, by means of which it may determine if the radio access network device 120 is updateable or not. If it is not, the core network node 140 may e.g. be arranged to generate a signal for informing at least the radio access network device 120 on the outcome, and preferably the terminal device 190 on the same. On the other hand, if the radio access network device 120 may be updated, the core network node 140 may be arranged to retrieve 240 data package to update the radio access network device. The retrieval of the data package may e.g. be performed by inquiring it from data storage 160 e.g. by including the identifier of the radio access network device 120 in the inquiry. In response to a receipt of the data package from the data storage 160, the core network node 140 may be arranged to deliver 250 the data package to the radio access network device 120 and instruct it to update itself to support the requested radio access technology related characteristic requested by the terminal device. For example, in response to the update, an acknowledgement of the update may be generated at least towards the core network node 140, but also to the terminal device 190. In some other embodiment, the core network node 140 may generate the acknowledgement and deliver it to the terminal device 190 through the radio access network device 120.

In an example embodiment described above it is indicated that the data package retrieved by the core network node 140 comprises data by means of which the radio access network device 120 may be updated. In some other example embodiments, the data storage 160 may also store one or more data packages for updating the terminal device 190 requesting the service. Such a situation may e.g. be advantageous when there is a new release available complying with the radio access technology related characteristic applied by the service or if an implementation of the system is such the terminal device 190 does not support the service by definition (e.g. when installed in a location) and there is need to confirm that the terminal device 190 may use the service applying the radio access technology related characteristic in question. In order to meet such a situation, or any corresponding situation, the core network node 140 may receive an identifier of the terminal device 190 together with the request, or with any other corresponding signaling, an inquire data package to update the terminal device 190 from the data storage 160. Naturally, the core network node 140 may be arranged to perform corresponding detections if the terminal device 190 supports the requested service or not and if the terminal device 190 is updateable or not as it performs with respect to the radio access network node 120. Hence, the data package may be retrieved from the data storage 160 on the basis of the identifier representing, or identifying, the terminal device 190 which identifier is included in the request received from the terminal device 190. Alternatively or in addition, the core network node 140 may retrieve the data package for the terminal device 190 on the basis of the radio access technology related characteristic applied by the service as requested. For example, the core network node 140 may be arranged to be aware of capabilities of the terminal device 190 and/or updates dedicated to the terminal devices 190, which e.g. are not yet distributed to the terminal devices 190, and based on that to retrieve data package to update also the terminal device 190. For sake of clarity it is worthwhile to mention that the data package retrieved from the data storage may comprise the update data for both the radio access network device 120 and the terminal device 190.

Still further, in some further example embodiments one or more predetermined criterion may be set of the retrieval of the data package. The criterion may e.g. be established based on at least one technical requirement for the data package or on at least one commercial requirement of the data package or both. The technical requirement may e.g. refer to an implementation in which the core network node 140 is arranged to consult the data storage on characteristics of the data packet, such as which release it is or when it is released. In some embodiment, the core network node 140 may compare information with respect to the data package to information received in the request, and to determine if there is newer version available for updating. Alternatively or in addition, the at least one technical requirement may be defined explicitly by the terminal device 190 or the radio access network device 120 and if the technical requirement cannot be fulfilled the data package is not retrieved.

Alternatively or in addition to the technical requirement one or more commercial requirements may be set for the data package. For example, a price for the data package may be determined in the storage which piece of information may be retrieved by the core network node 140 from the data storage. In response to the retrieval of the piece of information the core network node 140 may determine if the data package is to be downloaded or not. The determination may e.g. be performed by comparing if the price, or any corresponding piece of information, is acceptable or not. For example, the core network node 140 may consult some other entities, such as a register maintaining acceptable price values for one or more data packages and based on that to decide if the data package in question is retrieved or not.

In various example embodiments, the retrieval of the data package, especially comprising data package for the terminal device 190, may require a certain bandwidth in order to enable the retrieval of the data package. For such a requirement it may be arranged that the mobile communication network, i.e. the telecom operator, may provide an applicable bandwidth to the terminal device 190 for the delivery of the data package. The telecom operator may e.g. set a price for such a use of the communication connection for the delivery.

In the foregoing description the radio access technology related characteristic is indicated to be IoT related, such as a narrow-band IoT characteristic, which the terminal device 190 is willing to use. However, the present invention is not only limited to such a characteristic, but the characteristic may be any other. For example, the characteristic may be a definition for a frequency band used by the service, or a definition of a data speed used by the service of any combination of these.

Figure 3:
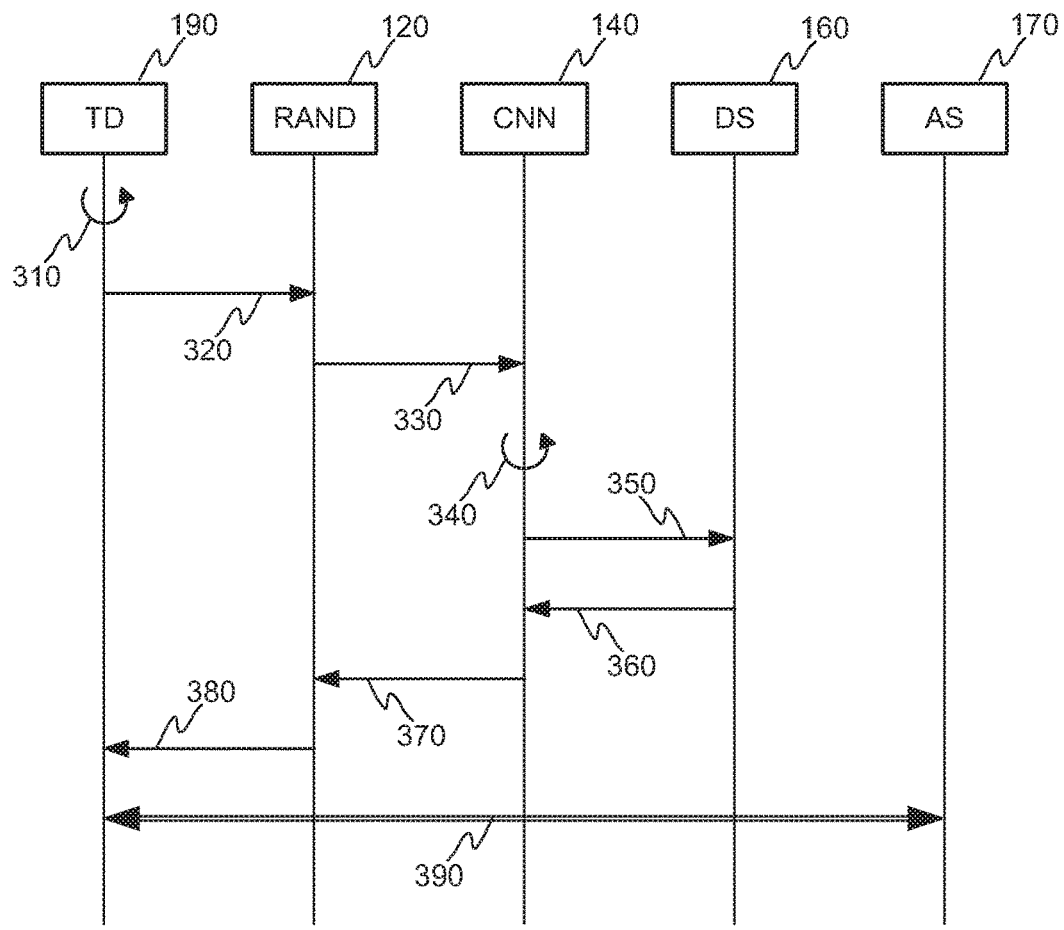
FIG. 3 illustrates schematically signaling between a plurality of entities according to an example embodiment of the invention.

FIG. 3 illustrates schematically as a flow chart signalling between a plurality of entities according to an example embodiment. First, a terminal device 190 may initiate an establishment of communication by performing a search 310 for a network service provided by a communication network. In response to finding the network service the terminal device may generate a signal 320 to a radio access network device 120 requesting a service applying a radio access technology related characteristic. The signal 320 of FIG. 3 may correspond to an attachment request. The radio access network device 120 may be arranged to forward the request to core network and, specifically, to a core network node 140 there (signal 330 in FIG. 3). In response to a receipt of the signal 330 the core network node 140 may be arranged to handle the request by performing the detections 220, 230 in the manner as described in the foregoing description (indicated with arrow 340 in FIG. 3). In response to a detection that the radio access network device 120 is updateable a retrieval of data package may be initiated from data storage 160 (signal 350). Prior to the retrieval of the data package further determinations may be performed through signalling, such as determining one or more technical issues and/or commercial issues. The data storage 160 shall be understood as any entity suitable for storing and delivering updates for the mentioned entities. In some embodiment the data storage may correspond to a marketplace, e.g. implemented as a server device, for telecom operators. The data storage may deliver the data package in question (signal 360) to the core network node 140. The core network node 140, in turn, may deliver the data package to the radio access network device 120 (signal 370), which may be configured to update itself in response to the receipt of the data package. In response to the update the radio access network device 120 may support the radio access technology related characteristic needed in the service requested by the terminal device 190. In addition to the data package the signal 370 may carry further information, such as an indication of an acceptance of the attachment.

With the signal 380 the radio access network device 120 may indicate to the terminal device 190 the acceptance of the attachment. Additional information may also be delivered, such as that the radio access network device 120 is updated to support the radio access technology related characteristic requested by the terminal device 120. In response to the update procedure, the terminal device 190 may start utilizing the updated radio access technology related characteristic and connect to an application server 170 serving the terminal device 190 in its task (signal 390 in FIG. 3).

In addition to the signals schematically illustrated in FIG. 3 further signalling may occur as well as the signals either illustrated in FIG. 3 or the further signals may carry further data. For example, as mentioned in the foregoing description there may be delivered data related to the terminal device 190, such as inquiries of updating also the terminal device 190 as well as data packet(s), or portions of the data packets, for updating the terminal device 190 e.g. to operate with the updated radio access network device 120.

Figure 4:
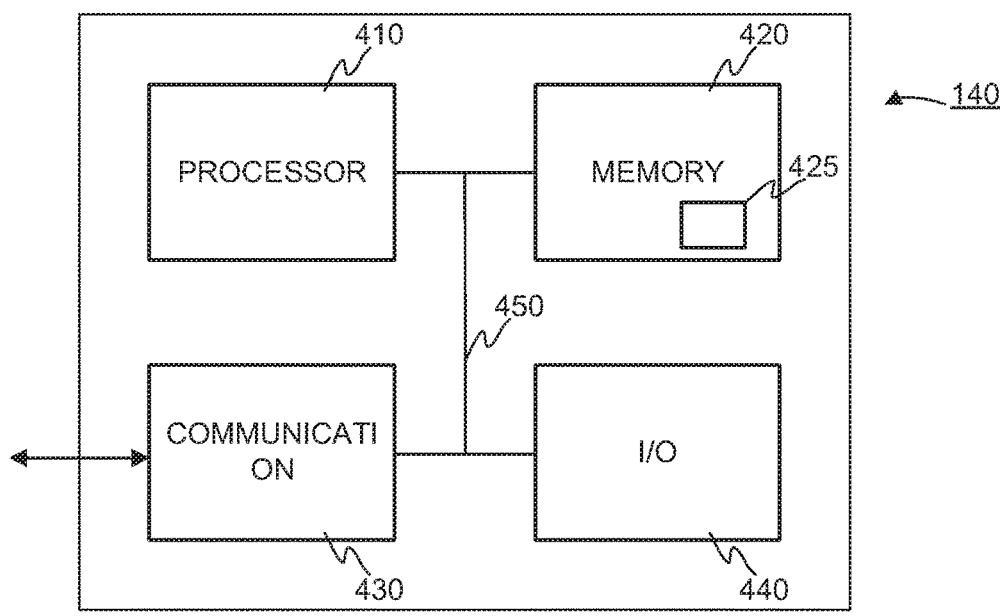
FIG. 4 illustrates schematically a core network node according to an example embodiment of the invention.

As discussed above, a system may comprise a network node 140 for implementing at least portions of the method as described. FIG. 4 illustrates schematically as a block diagram an example of the core network node 140 applicable in the system. The block diagram of FIG. 4 depicts some components of an apparatus that may be employed to implement the core network node 140. The apparatus comprises a processor 410 and a memory 420. The memory 420 may store data and computer program code 425. The apparatus may further comprise communication interface, or communication means, 430 for wired or wireless communication with other apparatuses and/or possible I/O (input/output) components 440 that may be arranged, together with the processor 410 and a portion of the computer program code 425, to provide an interface for receiving input from a user and/or providing output to the user operator. The components of the apparatus may be communicatively coupled to each other via a bus 450 that enables transfer of data and control information between the components.

The memory 420 and a portion of the computer program code 425 stored therein may be further arranged, with the processor 410, to cause the apparatus, i.e. the core network node 140, to perform the method as described. The processor 410 may be configured to read from and write to the memory 420. Although the processor 410 is depicted as a respective single component, it may be implemented as respective one or more separate processing components. Similarly, although the memory 420 is depicted as a respective single component, it may be implemented as respective one or more separate components, some or all of which may be integrated/removable and/or may provide permanent/semi-permanent/dynamic/cached storage.

The computer program code 425 may comprise computer-executable instructions that implement functions that correspond to steps of the method as will be described when loaded into the processor 410. As an example, the computer program code 425 may include a computer program consisting of one or more sequences of one or more instructions. The processor 410 is able to load and execute the computer program by reading the one or more sequences of one or more instructions included therein from the memory 420. The one or more sequences of one or more instructions may be configured to, when executed by the processor 410, cause the apparatus to perform the method will be described. Hence, the apparatus may comprise at least one processor 410 and at least one memory 420 including the computer program code 425 for one or more programs, the at least one memory 420 and the computer program code 425 configured to, with the at least one processor 410, cause the apparatus to perform the method described in the foregoing.

The computer program code 425 may be provided e.g. a computer program product comprising at least one computer-readable non-transitory medium having the computer program code 425 stored thereon, which computer program code 425, when executed by the processor 410 causes the apparatus to perform the method. The computer-readable non-transitory medium may comprise a memory device or a record medium such as a CD-ROM, a DVD, a Blu-ray disc or another article of manufacture that tangibly embodies the computer program. As another example, the computer program may be provided as a signal configured to reliably transfer the computer program.

The functionality of the core network node 140 may be implemented in a core network entity, such as in a Mobility Management Entity (MME).

The specific examples provided in the description given above should not be construed as limiting the applicability and/or the interpretation of the appended claims. Lists and groups of examples provided in the description given above are not exhaustive unless otherwise explicitly stated.

What is claimed is:

1. A method for updating a radio access technology-related characteristic of a radio access network device, the method comprising:

receiving, at a core network node from the radio access network device, an attachment request of a service applying the radio access technology-related characteristic, the request being initially generated by a terminal device in response to a detection of a radio access network providing communication services within an area of the terminal device, the request being transmitted from the terminal device to the radio access network device, a single identifier of the radio access network device derived by the radio access network device from the request being included by the radio access network device in the attachment request transmitted to the core network node;

determining, by the core network node, whether or not the radio access network device supports the requested service, in response to receipt of the attachment request;

instructing, by the core network device, the radio access network device to initiate a provision of the service, when the core network node determines that the radio access network device supports the requested service;

determining, by the core network node, a capability to update the radio access network device, when the core network node determines that the radio access network device does not support the request service, the determining the capability to update the radio access network device using the identifier of the radio access network device in a first inquiry to a database of the core network node to determine capabilities of the radio access network device regarding whether or not the radio access network device is updateable;

inquiring, by the core network node, a data package from a data storage of the communication network by including the identifier of the radio access network device in a second inquiry, when the core network node determines that the radio access network device is updateable;

retrieving, by the core network node, the data package from the data storage of the communication network to update at least the radio access network device; and delivering, by the core network node, the retrieved data package to the radio access network device to update the radio access network device to support the requested radio access technology-related characteristic requested by the terminal device, wherein the radio access technology-related characteristic is one of: a narrow-band IoT characteristic and data speed used in the service.

2. The method of claim 1, wherein the retrieved data package includes data to update the terminal device.

3. The method of claim 2, wherein the data to update the terminal device is included in the data package based on one of the following: an identifier representing the terminal device included in the request received from the terminal device, and the radio access technology-related characteristic applied by the service.

4. The method of claim 1, wherein at least one predetermined criterion is set for retrieving the data package.

5. The method of claim 4, wherein the at least one predetermined criterion is one of: at least one technical requirement for the data package, and at least one commercial requirement of the data package.

6. A network node for updating a radio access technology-related characteristic of a radio access network device, the network node comprising:
at least one processor; and
at least one memory including computer program code;
the at least one memory and the computer program code configured, with the at least one processor, to cause the network node to:
receive, by a core network node from the radio access network device, an attachment request of a service applying the radio access technology-related characteristic, the request being initially generated by a terminal device in response to a detection of a radio access network providing communication services within an area of the terminal device, the request being transmitted from the terminal device to the radio access network device, a single identifier of the radio access network device derived by the radio access network device from the request being included by the radio access network device in the attachment request transmitted to the core network node, determine, by the core network node, whether or not the radio access network device supports the requested service, in response to receipt of the attachment request, instruct, by the core network device, the radio access network device to initiate a provision of the service, when the core network node determines that the radio access network device supports the requested service, determine, by the core network node, a capability to update the radio access network device, when the core network node determines that the radio access network device does not support the request service, the determining the capability to update the radio access network device using the identifier of the radio access network device in a first inquiry to a database of the core network node to determine capabilities of the radio access network device regarding whether or not the radio access network device is updateable, inquire, by the core network node, a data package from a data storage of the communication network by including the identifier of the radio access network device in a second inquiry, when the core network node determines that the radio access network device is updateable, retrieve, by the core network node, the data package from the data storage of the communication network to update at least the radio access network device, and deliver, by the core network node, the retrieved data package to the radio access network device to update the radio access network device to support the requested radio access technology-related characteristic requested by the terminal device, wherein the radio access technology-related characteristic is one of: a narrow-band IoT characteristic and data speed used in the service.

7. The network node of claim 6, wherein the retrieved data package includes data to update the terminal device.

8. The network node of claim 7, wherein the network node is configured to receive the data to update the terminal device, the data to update the terminal device being included in the data package based on one of the following: an identifier representing the terminal device included in the request received from the terminal device, and the radio access technology-related characteristic applied by the service.

9. The network node of claim 6, wherein the network node comprises at least one predetermined criterion set for retrieving the data package.

10. The network node of claim 9, wherein the at least one predetermined criterion is one of: at least one technical requirement for the data package, and at least one commercial requirement of the data package.

11. A communication system, comprising:
  at least one terminal device;
  a radio access network device; and
  a network node comprising:
    at least one processor, and
    at least one memory including computer program code,
    the at least one memory and the computer program code configured, with the at least one processor, to cause the network node to:
    receive, by a core network node from the radio access network device, an attachment request of a service applying the radio access technology-related characteristic, the request being initially generated by a terminal device in response to a detection of a radio access network providing communication services within an area of the terminal device, the request being transmitted from the terminal device to the radio access network device, a single identifier of the radio access network device derived by the radio access network device from the request being included by the radio access network device in the attachment request transmitted to the core network node,
    determine, by the core network node, whether or not the radio access network device supports the requested service, in response to receipt of the attachment request,
    instruct, by the core network device, the radio access network device to initiate a provision of the service, when the core network node determines that the radio access network device supports the requested service,
    determine, by the core network node, a capability to update the radio access network device, when the core network node determines that the radio access network device does not support the request service, the determining the capability to update the radio access network device using the identifier of the radio access network device in a first inquiry to a database of the core network node to determine capabilities of the radio access network device regarding whether or not the radio access network device is updateable,
    inquire, by the core network node, a data package from a data storage of the communication network by including the identifier of the radio access network device in a second inquiry, when the core network node determines that the radio access network device is updateable,
    retrieve, by the core network node, the data package from the data storage of the communication network to update at least the radio access network device, and
    deliver, by the core network node, the retrieved data package to the radio access network device to update the radio access network device to support the requested radio access technology-related characteristic requested by the terminal device,
    wherein the radio access technology-related characteristic is one of: a narrow-band IoT characteristic and data speed used in the service.

12. A non-transitory computer-readable medium on which is stored a computer program comprising computer executable program code that, when executed by at least one processor of a network node, causes the network node to perform the method according to claim 1.

13. The method according to claim 1, wherein the terminal device is an IoT device.

* * * * *